June 10, 1958 — T. P. HAHN — 2,838,751
WARNING SIGNAL GENERATOR
Filed Nov. 27, 1953 — 2 Sheets-Sheet 1
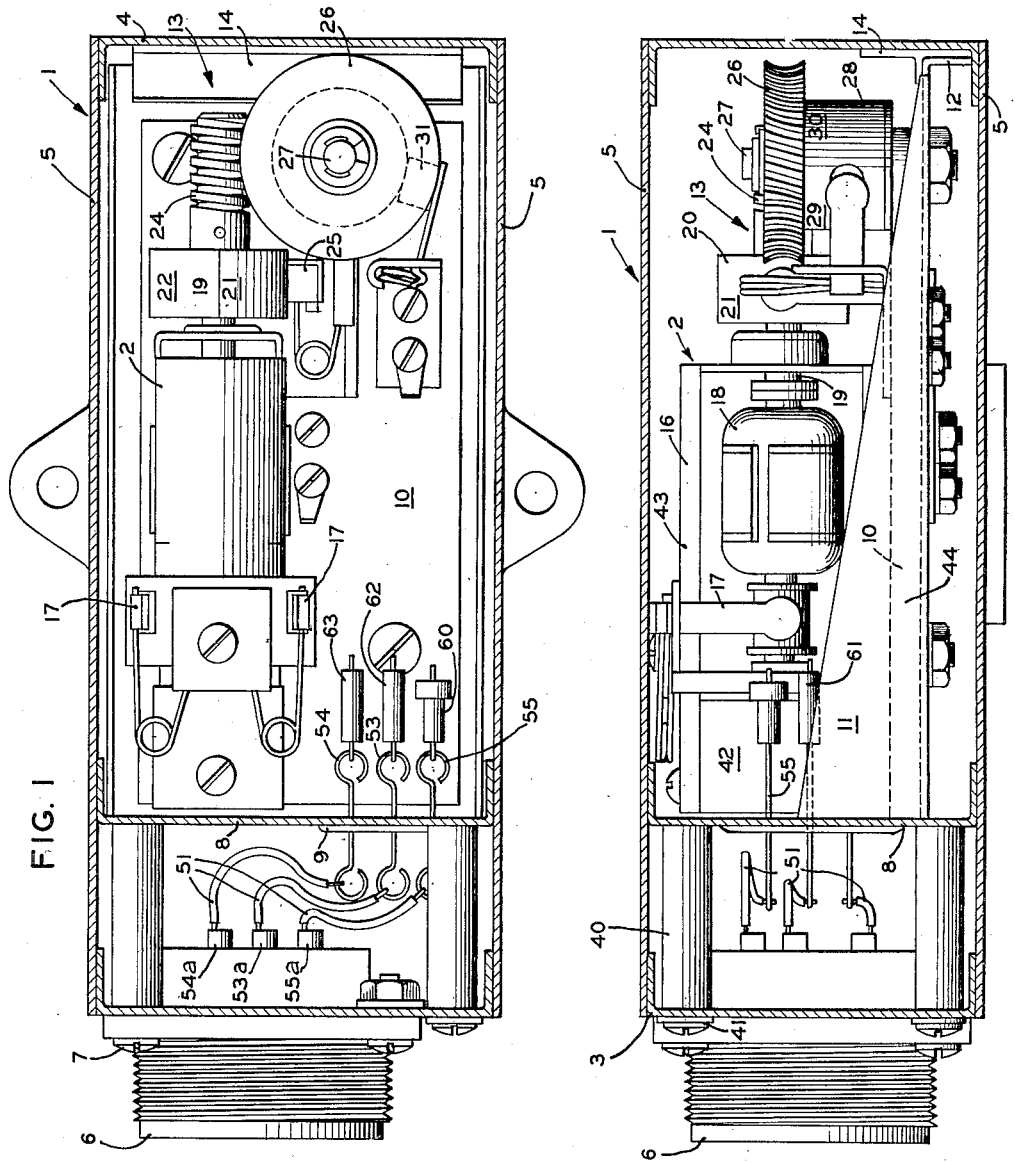
INVENTOR.
Thomas P. Hahn
BY
Norman Holland
ATTORNEY June 10, 1958  T. P. HAHN  2,838,751
WARNING SIGNAL GENERATOR
Filed Nov. 27, 1953  2 Sheets-Sheet 2

INVENTOR
Thomas P. Hahn
BY
Norman A. Holland
ATTORNEY

United States Patent Office 2,838,751
Patented June 10, 1958

2,838,751

WARNING SIGNAL GENERATOR

Thomas P. Hahn, Freeport, N. Y., assignor to
Christiaan J. Van Eyk, Byram, Conn.

Application November 27, 1953, Serial No. 394,648

1 Claim. (Cl. 340—345)

The present invention relates generally to signal generators and more particularly to a warning signal generator. Such signals are used to alert persons within earshot of the signal to a condition requiring immediate action. These signals are used on aircraft to warn pilots of the failure of landing gear to lock in either the down or up position, of fire, of the loss of flying speed or oil pressure and other conditions of danger. They are also used on shipboard to alert the crew to similar dangerous conditions requiring action, such as fire, collision, or sinking.

It has been customary to use either a mechanically driven klaxon horn or an electronic vacuum tube oscillator to generate such signals. The mechanical horn provides a direct sonic signal from a vibrated diaphragm and the oscillators are used to power loud speakers.

Mechanical sonic horns have the serious disadvantage that on modern aircraft and ships many of the personnel use radio headsets and thus cannot hear the signal from the horn. In addition, on aircraft at high altitudes the thinner air prevents a satisfactory sonic wave from being generated by the diaphragm and the pitch of the signal also changes with air pressure changes. The horns on both aircraft and ships are subject to mechanical failures and require frequent adjustments.

The electronic oscillators used as warning signal generators use relatively large amounts of power, are relatively fragile and require constant overhaul and maintenance. They do not provide the 100% reliability required for such a device.

The present invention provides an extremely small size motor powered generator which has an electric output signal of sawtooth wave form which can be fed directly to the headsets of the personnel to be alerted or to conveniently mounted loud speakers. It is smaller, more reliable, more shockproof, uses a minimum of power, and requires no adjustment. All of the above features are not inherent in electronic oscillators. This warning signal generator may be completely sealed from the atmosphere and can thus be made independent of pressure and humidity changes. The output signal may be applied to headsets or speakers as desired.

An object of the invention is to provide an improved warning signal generator.

Another object is to provide a compact, lightweight, shockproof warning signal generator.

Another object is to provide a warning signal generator which is independent of air pressure and humidity.

Another object of the invention is to provide a warning signal generator which may be connected to aircraft, ship, or vehicle intercommunication systems or to loud speaker systems.

Another object of the invention is to provide a warning signal generator whose output is adjustable both as to volume and signal pattern.

Other and further objects of the invention will be obvious upon an understanding of the illustrative embodiment about to be described, or will be indicated in the appended claims, and various advantages not referred to herein will occur to one skilled in the art upon employment of the invention in practice.

Fig. 1 is a plan view of the warning signal generator with a side panel removed;

Fig. 2 is a side elevational view of the device of Fig. 1 with a side panel removed;

Figure 4:
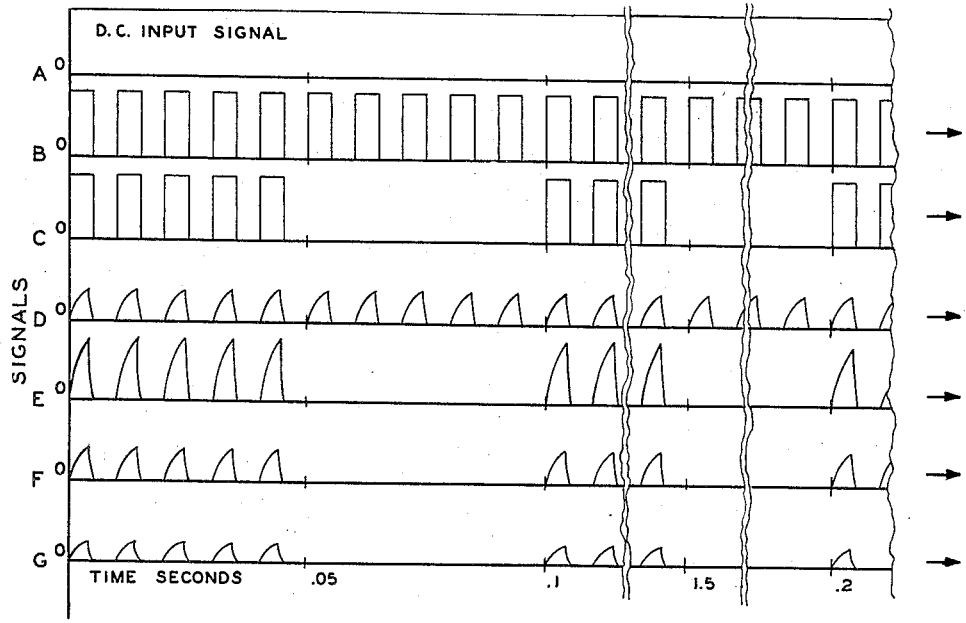
Fig. 4 is a graphical representation of the various output signals of the generator of Fig. 1.

Described generally and with particular reference to Figs. 1 and 2, the warning signal generator comprises an outer boxlike enclosure 1 containing an electric motor 2. A suitable electric connector 6 is mounted on one end of enclosure 1. A commutator device 13, comprising commutators 20 and 28, is mounted in the end of enclosure 1 and is driven by motor 2 to convert a D. C. input voltage into a sawtooth-shaped warning signal output as will be more fully described below.

Enclosure 1 comprises end members 3 and 4 with sides 5. The sides 5 are formed of a single piece of metal or other suitable material or of separate pieces welded, soldered, or otherwise fastened to all seams to provide an airtight cover. End pieces 3 and 4 are also welded, soldered, or otherwise fastened to side pieces 5 in an airtight manner. In order to assure an airtight seal for the interior of closure 1 when connector 6 is not hermetically tight, a bulkhead 8 is placed within the enclosure 1 adjacent member 3. Spacers 40 held by bolts 41 support bulkhead 8, which is additionally welded or soldered to sides 5 to form an airtight seal between bulkhead 8 and sides 5. A hermetically-sealed lead thru 9 is bonded by soldering to bulkhead 8 to provide electric connections to the airtight interior of enclosure 1.

Motor 2 and commutator device 13 are mounted on a board 10, preferably of insulating material. Board 10 is attached to bulkhead 8 by brackets 11 which are rigidly welded or otherwise fastened to bulkhead 8 at one end. The other end of brackets 11 are bent to form supports 12, which are held in place by the spring tension of clip 14.

Board 10 and the components mounted thereon, brackets 11, and bulkhead 8 may be assembled as a unit outside the enclosure 1. This assembly may then be slipped into enclosure 1 as a unit before end member 3 is in place. Support 12 slides under clip 14 and is held against movement by the spring tension of clip 14. Bulkhead 8 may then be sealed to sides 5 to complete the airtight enclosure of the components on board 10. Terminals 53 through 59 of lead thru 9 are connected by jumpers 51 to corresponding terminals 53a thru 59a of connector 6.

*Motor and commutators*

Motor 2 is a fractional horsepower motor of well-known construction. Frame 16 mounts motor 2 on board 10. Brushes 17 connect through connector 6 and lead thru 9 to a suitable source of D. C. voltage. On an aircraft this is preferably the 24-volt D. C. system. Permanent magnet 42 has pole pieces 43 and 44 to provide a field for armature 18 of motor 2.

Commutator device 13 comprises an audio pulse commutator 20 mounted on motor shaft 19 which turns at the motor speed. Commutator 20 is composed of two semi-circular halves 21 and 22, of which 21 is made of a conducting material and 22 is made of an insulating material. A voltage taken from the D. C. source is fed to commutator 20 by brush 25 mounted on board 10. A worm 24 of conducting material is attached to the end of shaft 19 and is electrically connected to the conducting half 21 of commutator 20 by direct contact or a suitable jumper (not shown). Worm 24 meshes with worm wheel 26 made of conducting material and mounted on vertical shaft 27 which is mounted on board 10. A second signal interrupter commutator is mounted on shaft 27 directly below worm gear 26. This commutator is constructed similar to commutator 20 with one half 29 made of conducting material and the other half 30 of an insulating material. The conducting half 29 is electrically connected to worm gear 26 by direct contact or a suitable jumper. Brush 31 mounted on board 10 contacts commutator 28. The ratio between worm 24 and worm gear 26 is set about 40 or 50 to one, as will be more fully explained below in connection with the electrical circuit description.

When brush 25 contacts conducting portion 21 of commutator 20, an electric signal placed on brush 25 will flow to worm 24, to worm gear 26, to conducting half 29 of commutator 28 and to brush 31 when it contacts conducting half 29. The function of the commutator in generating the warning signal will be described below with the electrical circuit.

*Electrical circuit*

Figure 3:
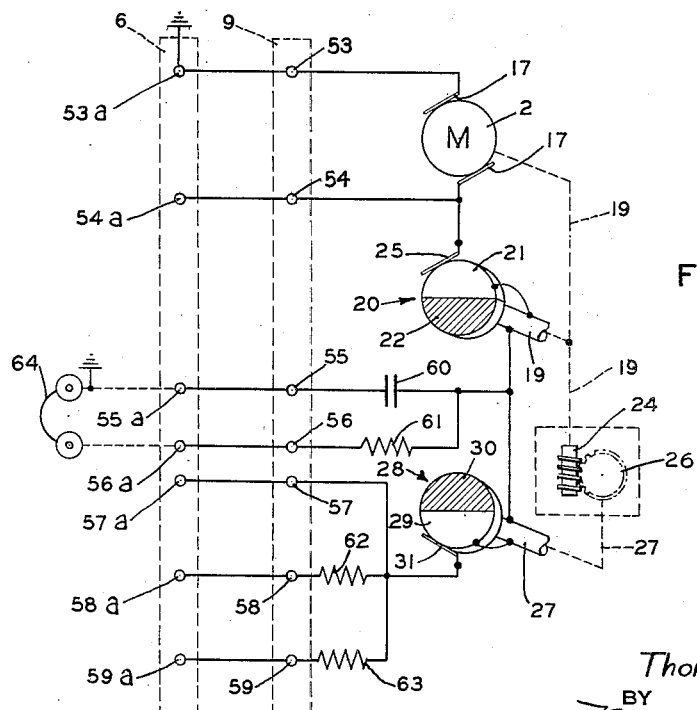
Fig. 3 is a schematic diagram of the electrical circuit of the generator of Fig. 1.

The electrical circuit of the warning signal generator is shown in Fig. 3. The circuit functions to convert a D. C. input voltage applied between terminals 53 and 54 to a sawtoothed output signal between terminal 55 and terminals 56 to 59 as will be described below.

Connector 6 has terminals 53a to 59a which are connected by jumpers 51 to corresponding terminals 53 through 59 of lead thru 9. A source of voltage is applied between terminals 53 and 54 which in the preferred embodiment is 24-volts D. C. with terminal 53 grounded. Motor 2 is is energized by being connected between terminal 54 and terminal 53.

Terminal 54 is connected to brush 25 on rotating commutator 20 and applies the 24-volt D. C. to the conducting portion 21 of commutator 20 while it is in contact with it. Conducting portion 21 is electrically connected by worm 24 and worm gear 26 to the conducting portion 29 of commutator 28 as described above. Commutator 20 is connected directly to shaft 19 of motor 2 and commutator 28 is driven from shaft 19 through the gear reduction of worm 24 and worm gear 26 as was more fully described above. Thus, as commutator 20 is rotated by shaft 19, the conducting portion 21 is energized half the time while brush 25 is in contact with conducting portion 21. The output of the conducting portion 21 of commutator 20 appears on conducting portion 29 of commutator 28. This square-wave signal is picked off commutator 28 by brush 31. The signal output of brush 31 is thus seen to be an audio square-wave signal interrupted at the frequency of the commutator 28.

The input signal between terminals 53 and 54 is shown at line A in Fig. 4 for the D. C. input voltage. The output of commutator 20 is a square wave as shown in line B. The output of commutator 28 is shown in line C. In order to simulate a raucous tone the output of brush 20 is fed to a wave-shaping circuit comprising condensers 60 and resistors 61, 62, and 63 and headset 64. As seen in Fig. 3, the headset 64 of the listener is connected between terminal 55a and one of the additional terminals 56a to 59a. It will be seen that the condenser 60 is effectively coupled across the headset 64 when the headset is connected between terminals 55a and 57a, and across the series combination of the headset 64 and one of the resistors 61, 62 or 63 when the headset 64 is connected between terminal 55a and terminal 56a, 58a or 59a. The sawtooth voltage results from the charging of the condenser 60 when the commutator segment is energized and the discharge of the condenser 60 through headset 64 and resistors 61—63 when the brush 25 is in contact with the non-conducting commutator segment 22.

When the headset is connected between terminals 55a and 56a, the listener hears an uninterrupted audio signal of line D, Fig. 4, which is the output of commutator 20 modified to a sawtooth shape by condenser 60 since commutator 28 is by-passed by terminal 56a. When the headset is connected to terminals 57a, 58a, or 59a, the listener hears an interrupted sawtooth signal corresponding to lines E, F and G, respectively (Fig. 4) which is the output of commutator 28 as modified by condenser 60. Terminal 57a provides a high-level unattenuated output as seen on line E (Fig. 4), terminal 58a provides a medium-level signal which is attenuated by resistor 62 as seen on line F (Fig. 4), and terminal 59a provides a low-level signal output attenuated by resistor 63 which has a higher value than resistor 62 as seen on line G (Fig. 4).

It is thus seen that the warning signal generator converts a D. C. input signal into a sawtooth-shaped output signal of which the signal characteristic and volume may be chosen to suit the circumstances. Thus the listener may be subjected to a steady warning tone or to an interrupted warning tone of adjustable volume. It is clear that any predetermined number of output levels may be provided with the circuit Fig. 3.

A preferable audio frequency has been found to be between 200 and 300 cycles per second and a preferable interrupter rate has been found to be between 4 and 6 cycles per second. These frequencies have been found to provide the most irritating sound to the listener, which results in his more immediate perception of the warning signal. It is obvious that other audio and interrupter frequencies may be used where desired. The audio frequency may be changed by changing the motor speed or the number of commutator segments and the interrupter frequency may be changed by changing the worm gear ratio or the number of interrupter commutator segments. For purposes of simplifying the description, the frequencies used in Fig. 4 are 100 cycles per second for the audio rate and 10 cycles per second for the interrupted rate.

It will be seen that the present invention provides a warning signal generator of small size which is practical for a wide variety of uses and which is especially adapted for use in aircraft, since it is independent of air pressure and humidity changes and may be hermetically sealed. A warning signal generator is provided which is small in size and which has low power requirements and high degree of shock resistance. The generator is simple to adjust, install, and maintain.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

An audio frequency warning signal generator comprising an electric motor having a rotary metallic conductive drive shaft, a first commutator mounted on said drive shaft to rotate therewith and having alternate conducting and insulating segments, a first brush making sliding contact with said first commutator and adapted for connection to a first terminal of a voltage source, said motor being adapted to move alternate commutator segments against said brush at a rate corresponding to an audio frequency, said conducting segment of said first brush contacting said motor shaft, a second commutator rotatably mounted and having alternate conducting and insulating segments, a metallic worm gear mounted concentrically with said second commutator and electrically connected with the conducting segment thereof, a metallic worm on said motor drive shaft engaging said worm gear whereby said second commutator is driven at a predetermined rate which is a fraction of the rate of said first commutator and whereby the conducting segments of said commutators are electrically connected together, a second brush making sliding contact with said second commutator and connected to an output terminal whereby a pulsed interrupted audio frequency output voltage appears between the second terminal of said voltage source and the output terminal, and a condenser connected between the second terminal of said voltage source and said interconnected conducting commutator segments to shape the output voltage by charging when said conducting commutator segments are energized by said voltage source and by discharging through a load connected between said second terminal of said voltage source and said output terminal when said conducting commutator segments are deenergized.

References Cited in the file of this patent

UNITED STATES PATENTS

| | | |
|---|---|---|
| 1,244,959 | Conover | Oct. 30, 1917 |
| 1,319,181 | Sethman | Oct. 21, 1919 |
| 1,262,916 | Boyle | Apr. 16, 1918 |
| 2,381,224 | Mitchell et al. | Aug. 7, 1945 |
| 2,658,192 | Spoon et al. | Nov. 3, 1953 |